United States Patent [19]

Keville et al.

[11] Patent Number: 5,295,432
[45] Date of Patent: Mar. 22, 1994

[54] CAN DRAINER INCLUDING MAGNETIZED PLATE AND SPLASH GUARD

[76] Inventors: Patricia M. Keville, 235 17th St. SE., Washington, D.C. 20003; Thomas J. Murphy, Jr., 7207 Patton Dr., Woodbine, Md. 21797

[21] Appl. No.: 21,278

[22] Filed: Feb. 22, 1993

Related U.S. Application Data

[63] Continuation-in-part of Ser. No. 947,547, Sep. 21, 1992.

[51] Int. Cl.⁵ ................................................ B30B 9/04
[52] U.S. Cl. .................................... 100/110; D7/665; 99/495; 100/266; 294/65.5
[58] Field of Search ............... 100/110, 116, 265, 266; 99/495; 294/65.5; D7/665, 666, 686, 668

[56] References Cited

U.S. PATENT DOCUMENTS

| | | | |
|---|---|---|---|
| D. 244,118 | 4/1977 | Dick | 100/234 X |
| D. 311,116 | 10/1990 | Pentland | 100/234 X |
| D. 330,313 | 10/1992 | Green | 100/234 X |
| 1,095,449 | 5/1914 | Brooks et al. | 100/266 X |
| 1,422,196 | 7/1922 | Gray | 100/266 X |
| 1,492,908 | 5/1924 | Trumbo | 100/110 X |
| 1,950,763 | 3/1934 | Walter | 100/265 X |
| 2,772,381 | 11/1956 | Rhodes | 294/65.5 X |
| 2,976,075 | 3/1961 | Budreck | 294/65.5 |
| 3,120,678 | 2/1964 | Glenny | 100/266 X |
| 3,515,057 | 6/1970 | Aldridge | 100/266 X |
| 3,995,544 | 12/1976 | Farley | 100/116 |
| 4,355,574 | 10/1982 | Bond et al. | 100/110 X |
| 4,620,739 | 11/1986 | Coralline | 294/65.5 |
| 4,633,563 | 1/1987 | Rykaczewski | 294/65.5 X |
| 4,860,647 | 8/1989 | Kerslake | 100/110 X |

FOREIGN PATENT DOCUMENTS 929300 6/1955 Fed. Rep. of Germany ..... 294/65.5

*Primary Examiner*—Stephen F. Gerrity

[57] ABSTRACT

A hand utensil for draining liquid from canned foods, or for removing can lids after opening and of the type have a receiver base unit (30) with a fixed handle (36) which contains a pass through shaft (32, 34) containing a spring (18) in which the T shaped plunger handle (10) passes through when compressed causing the magnetized plate (22) to place pressure on a lid of an opened can, and when uncompressed the T shaped plunger handle (10) will return to its original position causing the can lid to be removed from the can attached to the magnetized plate (22). The utensil is made of an inflexible material so that it is strong enough to safely provide the required pressure.

2 Claims, 2 Drawing Sheets

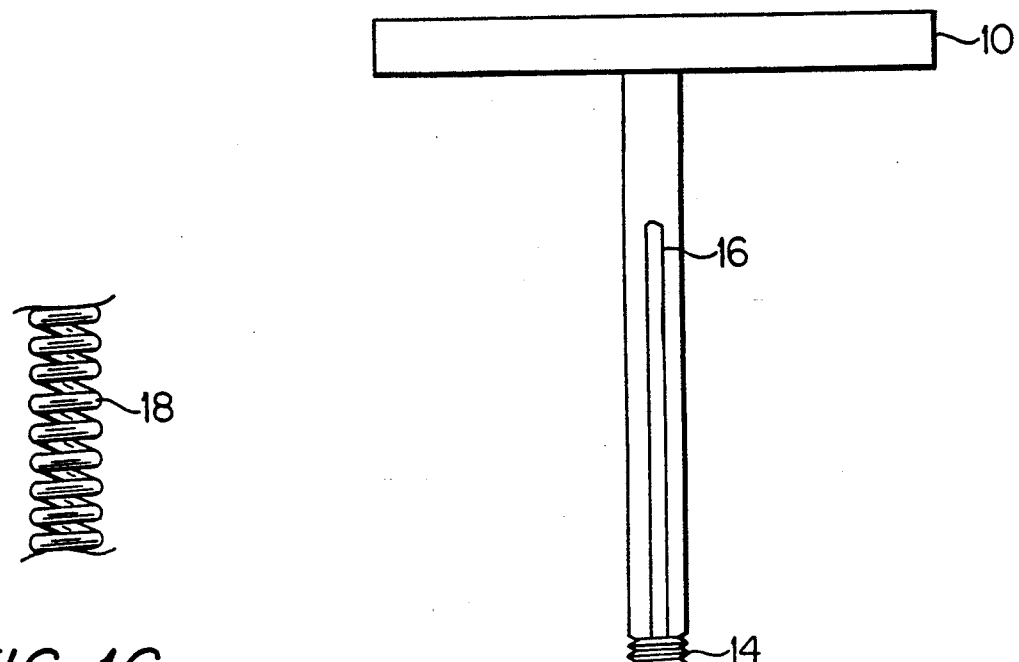
FIG. 1C
FIG. 1D
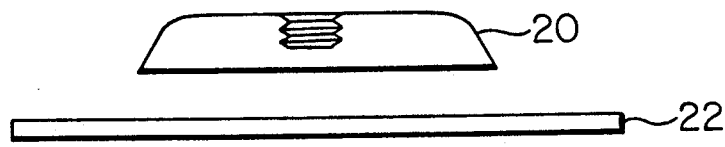
FIG. 1E
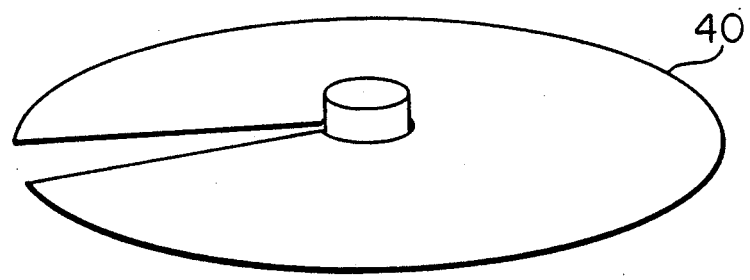
FIG. 1F

CAN DRAINER INCLUDING MAGNETIZED PLATE AND SPLASH GUARD

This application in part discloses and claims subject matter in addition to that disclosed in the prior co-pending application Ser. No. 07/947,547 filed Sep. 21, 1992, of which this is a continuation-in-part (pending).

BACKGROUND—FIELD OF THE INVENTION

This invention relates to food can drainers, and can lid removal.

BACKGROUND—DESCRIPTION OF PRIOR ART

Canned food commonly supplied for purchase by consumers contains liquids. These liquids, while required to provide moisture for the food while it is in the can, are generally unwanted at the time the food is removed from the can for preparation and consumption.

Current methods for draining the unwanted liquids, and removing the can lid, include the following:

(a) Opening the can, removing the lid, and placing the contents in a colander to drain the liquid (an unsanitary operation since the food is exposed while draining in the colander).

(b) Opening the can, holding the now loose lid in place with fingers, and turning the can to drain (an operation both unsafe and unsanitary).

(c) For more solid canned foods (tuna, salmon, crushed pineapple and others) the can is opened, the lid retained in place by fingers and pressure applied to the can lid to force out the liquid, (again, unsanitary and unsafe) or the lid is removed and the contents placed on a paper towel in order to soak up the unwanted liquid. Again, this is unsanitary as the food is exposed to the surrounding air and contaminants while the food is draining.

(d) Another unsanitary and unsafe process involves using ones fingers, a knife, fork or a like instrument to remove the sharp lid from the can as the lid may have become wedged in the can when compressed by ones fingers.

(e) Clothing may also be soiled or stained from the resultant liquid either squirting out of the can or coming in contact with ones fingers.

(f) Can lids of canned food (sauces, soups, etc.) sometimes slide into the can contents after opening causing one to use fingers, fork, knife, etc. to attempt to retrieve the can lid. This again presents unsanitary and unsafe conditions.

In each of the above processes, there are unsanitary, unsafe, and time consuming actions required to drain the unwanted liquid from a can, or to remove a lid from a can.

OBJECTS AND ADVANTAGES

Accordingly, besides the objects and advantages of the liquid drainer described in our above patent, several objects and advantages of the present invention are:

(a) to provide a food can drainer and lid removal tool which will reduce the time required in the meal preparation process.

(b) to provide a food can drainer and lid removal tool whose production allows for improved safety and less injuries due to decreased handling of sharp can lids.

(c) to provide a food can drainer and lid removal tool whose production allows for improved sanitary conditions due to less handling of the can lid, and a decreased period of time opened food is exposed to the air.

(d) to provide a food can drainer and lid removal tool which will reduce the number of injuries caused by improper use of a can lid to affect the draining process.

(e) to provide a food can drainer and lid removal tool which reduces spillage and requires less contact with ones hands.

(f) to provide a can drainer and lid removal tool which requires only a one handed operation to assist those who are physically unable to use the manual draining process which requires the use of both hands.

DRAWING FIGURES

FIGS. 1B through 1F show the can drainer components.

Reference Numbers in Drawings

Figure 1A:
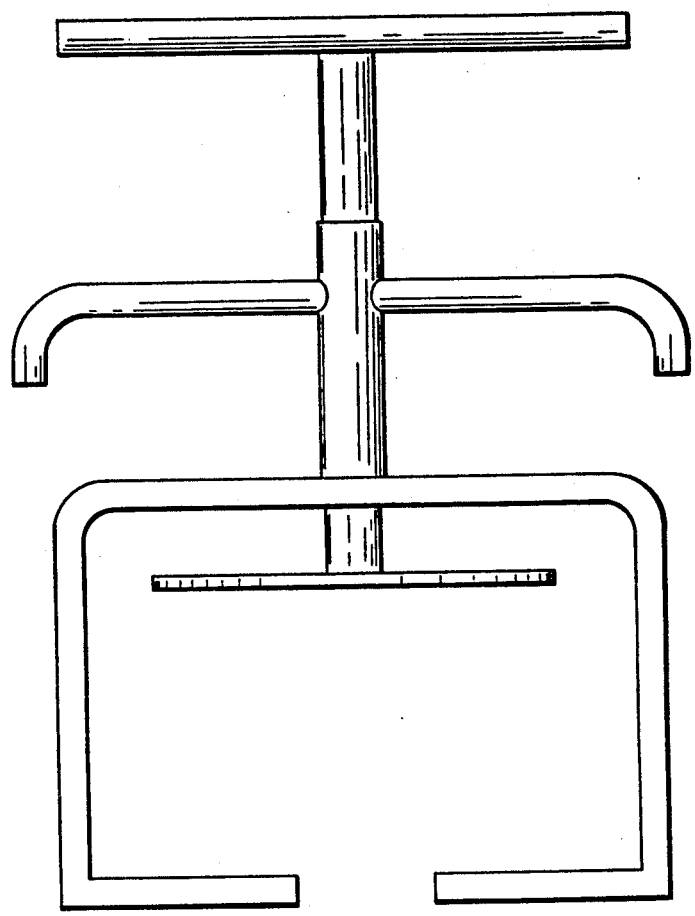
FIG. 1A shows the can drainer laying flat.

10 T shaped plunger handle with spline
14 threaded end
16 guide tongue
18 spring
20 enclosed magnet with female threaded receptacle
22 plate
30 receiver base unit
32 receiver top shaft hole with groove
34 receiver bottom shaft hole
36 fixed handle
40 splash guard

Descriptions—FIGS 1A-1F

Figure 1B:
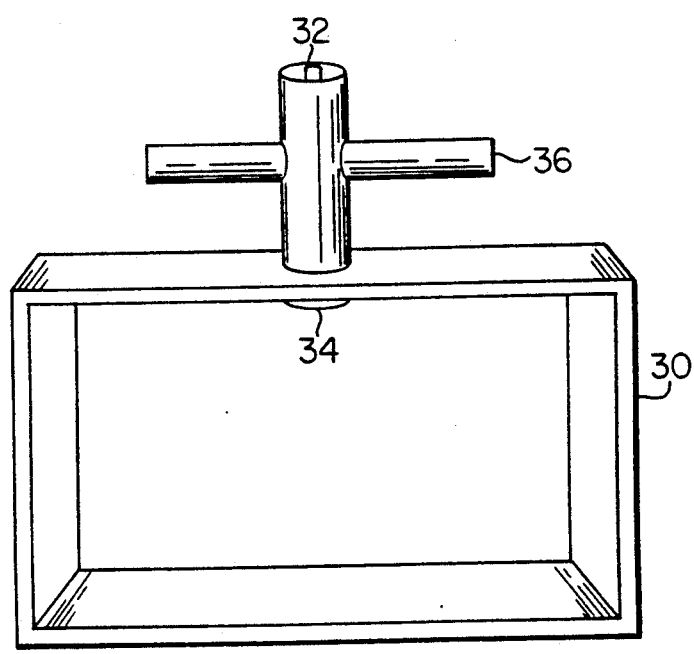

A typical embodiment of the unit of the present invention is illustrated in FIG. 1A. The unit has a fixed receiver base 30 (FIG. 1B) with a receiver top shaft hole 32 (FIG. 1B) and a receiver bottom shaft hole 34 (FIG. 1B) and a fixed handle 36 (FIG. 1B). The fixed receiver base 30 (FIG. 1B) houses a compression spring 18 (FIG. 1C). A T shaped plunger handle with spline 10 (FIG. 1D) inserts through the receiver top shaft hole 32 (FIG. 1B), the compression spring 18 (FIG. 1C), and the receiver bottom shaft hole 34 (FIG. 1B) with the guide tongue 16 (FIG. 1D) aligned with the groove contained in the receiver top shaft hole 32 (FIG. 1B). The enclosed magnet with threaded female receptacle 20 (FIG. 1E), is attached to a magnetically conductive plate 22 (FIG. 1E) and the plate 22 (FIG. 1E) and enclosed magnet with female threaded receptacle 20 (FIG. 1E) is attached, via turning to the threaded end 14 (FIG. 1D) of the T shaped plunger handle with spline 10 (FIG. 1D) with guide tongue 16 (FIG. 1D). The spline on the T shaped plunger handle 10 (FIG. 1D) engages the spring 18 (FIG. 1C) during the compression process which causes the T shaped plunger handle 10 (FIG. 1D) to return to the up position upon release of the T shaped plunger handle 10 (FIG. 1D).

The splash guard 40 (FIG. 1F) slides over the receiver base unit 30 (FIG. 1B).

Operation—FIG. 1A

The manner of using this invention to drain liquids is to place the can requiring draining or lid removal on the bottom of the receiver base unit 30. The lid has already been cut by an electrical or manual can opener and is still laying within the can. To drain the liquid one places ones fingers around the receiver unit fixed handle 36 and ones thumb and palm over the T shaped plunger handle 10. Pressure is applied by squeezing the T shaped plunger handle 10 toward the base handle 36. This action will expel the magnetized plate 22 against the can lid, and cause the magnetized plate 22 to magnetically affix itself to the can lid. To cause the liquid to drain, one tilts the invention while applying sufficient pressure to expel the liquid, directing it to the desired receptacle.

Upon completion of the draining process, or upon removal of the lid, when releasing pressure on the T shaped plunger handle 10, the compression spring 18 will cause the T shaped plunger handle 10 to return to its original place with the can lid attached to the magnetized plate 22. One now removes the lid from the magnetized plate 22. One can now disassemble the unit for cleaning purposes.

SUMMARY, RAMIFICATIONS, AND SCOPE

Accordingly, the reader will see that the utility of this invention can be used to safely drain liquid or remove a lid from a can of opened food, will reduce the time currently required in the food preparation process, will reduce injuries by providing a tool which eliminates the need for individuals to improperly use a sharp can lid as part of the draining process, will reduce injuries resulting from extracting the can's lid which may also become wedged inside can after manually draining, will improve the sanitary conditions by eliminating the time food is exposed to the air for draining or handled unnecessarily and improperly, will reduce the risk of ruining clothing due to squirting liquids or soiled fingers, and will allow one handed operation so that those with an impairment to one hand can drain unwanted liquids.

Although the description above contains many specificities these should not be construed as limiting the scope of the invention but as merely providing illustrations of some of the presently preferred embodiments of this invention.

Thus the scope of the invention should be determined by the appended claims and their legal equivalents rather than by the examples given.

We claim:
1. A can draining device for draining an opened can with a detached lid comprising:
   (a) a base with first and second ends;
   (b) a first upright with first and second ends connected to the first end of the base at the first end of the first upright;
   (c) a second upright with first and second ends connected to the second end of the base at the first end of the second upright;
   (d) a crosspiece connected to the first and second uprights at the second end of the first and second uprights with a hole extending through the crosspiece;
   (e) a hollow tubular member which houses a groove inside the hollow shaft extending from the crosspiece in a direction opposite the base;
   (f) a first handle means connected to the tubular member;
   (g) a shaft having first and second ends extending through the hollow tubular member and the hole in the crosspiece which has a guide tongue that fits into the groove in the hollow tubular member;
   (h) a second handle means connected to the shaft at the first end of the shaft;
   (i) a splash guard mounted to the tubular member; and
   (j) an enclosed magnet mounted to a plate which magnetizes the plate, the magnetized plate attached to the second end of the shaft whereby a can positioned between the magnetized plate and base may be drained when the lid, magnetically held by the magnetized plate, is squeezed by pressing the shaft through the tubular member and compressing the lid of the can, thereby draining the can's liquids which are directed out of the can against the splash guard.
2. The invention of claim 1, wherein a spring is housed within and is connected to the hollow tubular member and is connected to the shaft and is adapted to bias the magnetized plate in a direction away from the base.

* * * * *